(12) United States Patent
Beauchamp et al.

(10) Patent No.: US 7,904,823 B2
(45) Date of Patent: Mar. 8, 2011

(54) TRANSPARENT WINDOWS METHODS AND APPARATUS THEREFOR

(75) Inventors: Tim Beauchamp, Belmont, CA (US); Geoffrey Deane Owen Nicholls, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1114 days.

(21) Appl. No.: 10/391,073

(22) Filed: Mar. 17, 2003

(65) Prior Publication Data

US 2008/0046837 A1 Feb. 21, 2008

(51) Int. Cl.
*G06F 3/048* (2006.01)

(52) U.S. Cl. ........................................ 715/768

(58) Field of Classification Search .................. 715/768, 715/863, 864
See application file for complete search history.

(56) References Cited

U.S. PATENT DOCUMENTS

| | | | |
|---|---|---|---|
| 5,033,009 A | 7/1991 | Dubnoff | |
| 5,510,980 A | 4/1996 | Peters | |
| 5,553,215 A | 9/1996 | Kaethler | |
| 5,592,608 A | 1/1997 | Weber et al. | |
| 5,613,131 A | 3/1997 | Moss et al. | |
| 5,615,362 A | 3/1997 | Jensen et al. | |
| 5,654,726 A | 8/1997 | Mima et al. | |
| 5,721,847 A | 2/1998 | Johnson | |
| 5,754,774 A | 5/1998 | Bittinger et al. | |
| 5,758,337 A | 5/1998 | Hammond | |
| 5,765,164 A | 6/1998 | Prasad et al. | |
| 5,778,372 A | 7/1998 | Cordell et al. | |
| 5,781,911 A | 7/1998 | Young et al. | |
| 5,784,275 A | 7/1998 | Sojoodi et al. | |
| 5,787,409 A | 7/1998 | Seiffert et al. | |
| 5,809,267 A | 9/1998 | Moran et al. | |
| 5,812,840 A | 9/1998 | Shwartz | |
| 5,831,609 A | 11/1998 | London et al. | |
| 5,831,615 A * | 11/1998 | Drews et al. | 715/768 |
| 5,857,201 A | 1/1999 | Wright, Jr. et al. | |
| 5,862,325 A | 1/1999 | Reed et al. | |
| 5,864,669 A | 1/1999 | Osterman et al. | |
| 5,893,126 A * | 4/1999 | Drews et al. | 715/512 |
| 5,893,150 A | 4/1999 | Hagersten et al. | |
| 5,898,434 A | 4/1999 | Small et al. | |

(Continued)

FOREIGN PATENT DOCUMENTS

WO WO 01/63466 A2 8/2001

OTHER PUBLICATIONS

"Report of Novelty Search", PATENTEC, dated Apr. 3, 2004.

(Continued)

*Primary Examiner* — Thanh T Vu
(74) *Attorney, Agent, or Firm* — Kilpatrick Townsend & Stockton LLP (57) ABSTRACT

A method for optimizing pen-based annotations on a non-pen enabled window. The method includes starting a visible non-pen-enabled window further including position indicia and size indicia; starting a transparent pen-enabled window; and associating the visible non-pen-enabled window with the transparent pen-enabled window based on the position indicia and size indicia. The method further includes aligning the transparent pen-enabled window with the visible non-pen-enabled window, and accepting user input comprising a message. If the message further includes pen indicia, the method also includes forwarding the message to the transparent pen-enabled window. Else, the method includes forwarding the message to the first application.

24 Claims, 5 Drawing Sheets

U.S. PATENT DOCUMENTS

| | | | |
|---|---|---|---|
| 5,918,009 A | 6/1999 | Gehani et al. | |
| 5,922,044 A | 7/1999 | Banthia | |
| 5,926,177 A | 7/1999 | Hatanaka et al. | |
| 5,928,327 A | 7/1999 | Wang et al. | |
| 5,930,794 A | 7/1999 | Linenbach et al. | |
| 5,943,620 A | 8/1999 | Boltz et al. | |
| 5,974,236 A | 10/1999 | Sherman | |
| 6,023,694 A | 2/2000 | Kouchi et al. | |
| 6,025,844 A | 2/2000 | Parsons | |
| 6,035,324 A | 3/2000 | Chang | |
| 6,038,558 A | 3/2000 | Powers et al. | |
| 6,055,548 A | 4/2000 | Comer et al. | |
| 6,070,197 A | 5/2000 | Cobb et al. | |
| 6,073,242 A | 6/2000 | Hardy et al. | |
| 6,075,530 A | 6/2000 | Lucas et al. | |
| 6,088,481 A * | 7/2000 | Okamoto et al. | 382/189 |
| 6,092,102 A | 7/2000 | Wagner | |
| 6,094,681 A | 7/2000 | Shaffer et al. | |
| 6,112,236 A | 8/2000 | Dollin et al. | |
| 6,170,019 B1 | 1/2001 | Dresel et al. | |
| 6,175,859 B1 | 1/2001 | Mohler | |
| 6,185,582 B1 | 2/2001 | Zellweger et al. | |
| 6,189,069 B1 | 2/2001 | Parkes et al. | |
| 6,201,539 B1 | 3/2001 | Miller et al. | |
| 6,204,846 B1 | 3/2001 | Little et al. | |
| 6,205,474 B1 | 3/2001 | Hurley | |
| 6,208,990 B1 | 3/2001 | Suresh et al. | |
| 6,233,578 B1 | 5/2001 | Machihara et al. | |
| 6,239,797 B1 | 5/2001 | Hills et al. | |
| 6,240,444 B1 | 5/2001 | Fin et al. | |
| 6,243,698 B1 | 6/2001 | Powers et al. | |
| 6,243,713 B1 | 6/2001 | Nelson et al. | |
| 6,256,649 B1 | 7/2001 | Mackinlay et al. | |
| 6,256,676 B1 | 7/2001 | Taylor et al. | |
| 6,269,393 B1 | 7/2001 | Yost et al. | |
| 6,292,803 B1 | 9/2001 | Richardson et al. | |
| 6,301,601 B1 | 10/2001 | Helland et al. | |
| 6,304,546 B1 | 10/2001 | Natarajan et al. | |
| 6,314,463 B1 | 11/2001 | Abbott et al. | |
| 6,317,737 B1 | 11/2001 | Gorelik et al. | |
| 6,336,135 B1 | 1/2002 | Niblett et al. | |
| 6,341,312 B1 | 1/2002 | French et al. | |
| 6,348,933 B1 | 2/2002 | Walls et al. | |
| 6,363,363 B1 | 3/2002 | Haller et al. | |
| 6,393,421 B1 | 5/2002 | Paglin | |
| 6,397,217 B1 | 5/2002 | Melbin | |
| 6,430,576 B1 | 8/2002 | Gates et al. | |
| 6,449,344 B1 | 9/2002 | Goldfinger et al. | |
| 6,467,052 B1 | 10/2002 | Kaler et al. | |
| 6,480,847 B1 | 11/2002 | Linenbach et al. | |
| 6,501,956 B1 | 12/2002 | Weeren et al. | |
| 6,510,457 B1 | 1/2003 | Ayukawa et al. | |
| 6,513,047 B1 | 1/2003 | Talley | |
| 6,519,568 B1 | 2/2003 | Harvey et al. | |
| 6,523,046 B2 | 2/2003 | Liu et al. | |
| 6,532,465 B2 | 3/2003 | Hartley et al. | |
| 6,542,165 B1 * | 4/2003 | Ohkado | 715/751 |
| 6,567,796 B1 | 5/2003 | Yost et al. | |
| 6,567,814 B1 | 5/2003 | Bankier et al. | |
| 6,574,618 B2 | 6/2003 | Eylon et al. | |
| 6,574,639 B2 | 6/2003 | Carey et al. | |
| 6,591,277 B2 | 7/2003 | Spence et al. | |
| 6,591,278 B1 | 7/2003 | Ernst | |
| 6,598,167 B2 | 7/2003 | Devine et al. | |
| 6,606,596 B1 | 8/2003 | Zirngibl et al. | |
| 6,640,234 B1 | 10/2003 | Coffen et al. | |
| 6,647,272 B1 | 11/2003 | Asikainen | |
| 6,651,055 B1 | 11/2003 | Kilmer et al. | |
| 6,651,142 B1 | 11/2003 | Gorelik et al. | |
| 6,687,360 B2 | 2/2004 | Kung et al. | |
| 6,701,485 B1 | 3/2004 | Igra et al. | |
| 6,714,982 B1 | 3/2004 | McDonough et al. | |
| 6,731,314 B1 | 5/2004 | Cheng et al. | |
| 6,745,193 B1 | 6/2004 | Horvitz et al. | |
| 6,775,267 B1 | 8/2004 | Kung et al. | |
| 6,782,424 B2 | 8/2004 | Yodaiken | |
| 6,789,083 B2 | 9/2004 | Thelen | |
| 6,832,341 B1 | 12/2004 | Vijayan | |
| 6,870,830 B1 | 3/2005 | Schuster et al. | |
| 6,898,625 B2 | 5/2005 | Henry et al. | |
| 6,901,592 B2 | 5/2005 | Mar et al. | |
| 6,907,422 B1 | 6/2005 | Predovic | |
| 6,915,457 B1 | 7/2005 | Miller | |
| 6,920,607 B1 | 7/2005 | Ali et al. | |
| 6,937,713 B1 | 8/2005 | Kung et al. | |
| 6,938,221 B2 * | 8/2005 | Nguyen | 715/863 |
| 6,941,345 B1 | 9/2005 | Kapil et al. | |
| 6,941,351 B2 | 9/2005 | Vetrivelkumaran et al. | |
| 6,954,757 B2 | 10/2005 | Zargham et al. | |
| 6,954,902 B2 * | 10/2005 | Noma et al. | 715/753 |
| 6,996,768 B1 | 2/2006 | Elo et al. | |
| 7,003,568 B1 | 2/2006 | Chikada et al. | |
| 7,003,731 B1 | 2/2006 | Rhoads et al. | |
| 7,024,474 B2 | 4/2006 | Clubb et al. | |
| 7,028,092 B2 | 4/2006 | MeLampy et al. | |
| 7,031,314 B2 | 4/2006 | Craig et al. | |
| 7,032,006 B2 | 4/2006 | Zhuk | |
| 7,058,953 B2 | 6/2006 | Willard et al. | |
| 7,096,432 B2 * | 8/2006 | Huapaya et al. | 715/863 |
| 7,113,964 B1 | 9/2006 | Bequet et al. | |
| 7,120,139 B1 | 10/2006 | Kung et al. | |
| 7,171,473 B1 | 1/2007 | Eftis et al. | |
| 7,174,339 B1 | 2/2007 | Wucherer et al. | |
| 7,177,909 B2 | 2/2007 | Stark et al. | |
| 7,197,565 B2 | 3/2007 | Abdelaziz et al. | |
| 7,221,658 B1 | 5/2007 | Armstrong et al. | |
| 7,222,294 B2 | 5/2007 | Coffen et al. | |
| 7,243,124 B1 | 7/2007 | Gardner et al. | |
| 7,243,127 B2 | 7/2007 | Tabayoyon, Jr. et al. | |
| 7,272,660 B1 | 9/2007 | Powers et al. | |
| 7,275,215 B2 | 9/2007 | Werndorfer et al. | |
| 7,296,217 B1 | 11/2007 | Earnshaw et al. | |
| 7,313,617 B2 | 12/2007 | Malik et al. | |
| 7,359,938 B1 | 4/2008 | Davies et al. | |
| 7,373,428 B1 | 5/2008 | Armstrong et al. | |
| 7,386,588 B2 | 6/2008 | Mousseau et al. | |
| 7,389,351 B2 | 6/2008 | Horvitz | |
| 7,392,478 B2 | 6/2008 | Aureglia et al. | |
| 7,401,158 B2 | 7/2008 | Beauchamp et al. | |
| 7,406,569 B2 | 7/2008 | Van de Waerdt | |
| 7,412,481 B2 | 8/2008 | Nicholls et al. | |
| 7,412,486 B1 | 8/2008 | Petrack et al. | |
| 7,412,518 B1 | 8/2008 | Duigou et al. | |
| 7,412,645 B2 | 8/2008 | Kotler et al. | |
| 7,426,059 B2 | 9/2008 | Broda et al. | |
| 7,436,947 B2 | 10/2008 | Ordille et al. | |
| 7,454,423 B2 | 11/2008 | Powers et al. | |
| 7,487,437 B2 | 2/2009 | Aureglia et al. | |
| 2001/0034733 A1 | 10/2001 | Prompt et al. | |
| 2001/0039616 A1 | 11/2001 | Kumagai et al. | |
| 2001/0040945 A1 | 11/2001 | Fujino et al. | |
| 2001/0049683 A1 | 12/2001 | Yoshikawa | |
| 2001/0049721 A1 | 12/2001 | Blair et al. | |
| 2002/0013853 A1 | 1/2002 | Baber et al. | |
| 2002/0032602 A1 | 3/2002 | Lanzillo et al. | |
| 2002/0038217 A1 | 3/2002 | Young | |
| 2002/0057678 A1 | 5/2002 | Jiang et al. | |
| 2002/0059472 A1 | 5/2002 | Wollrath et al. | |
| 2002/0065894 A1 | 5/2002 | Dalal et al. | |
| 2002/0078208 A1 | 6/2002 | Crump et al. | |
| 2002/0083067 A1 | 6/2002 | Tamayo et al. | |
| 2002/0083072 A1 | 6/2002 | Steuart | |
| 2002/0103909 A1 | 8/2002 | Devine et al. | |
| 2002/0107864 A1 | 8/2002 | Battas et al. | |
| 2002/0107905 A1 | 8/2002 | Roe et al. | |
| 2002/0107957 A1 | 8/2002 | Zargham et al. | |
| 2002/0116362 A1 | 8/2002 | Li et al. | |
| 2002/0120697 A1 | 8/2002 | Generous et al. | |
| 2002/0120765 A1 | 8/2002 | Boehmke | |
| 2002/0138640 A1 | 9/2002 | Raz et al. | |
| 2002/0143710 A1 | 10/2002 | Liu | |
| 2002/0152402 A1 | 10/2002 | Tov et al. | |
| 2002/0165849 A1 | 11/2002 | Singh et al. | |
| 2002/0178353 A1 | 11/2002 | Graham | |
| 2002/0184187 A1 | 12/2002 | Bakalash et al. | |
| 2002/0198985 A1 | 12/2002 | Fraenkel et al. | |
| 2003/0004742 A1 | 1/2003 | Palmer et al. | |

| | | |
|---|---|---|
| 2003/0023691 A1 | 1/2003 | Knauerhase |
| 2003/0028682 A1 | 2/2003 | Sutherland |
| 2003/0028683 A1 | 2/2003 | Yorke et al. |
| 2003/0033329 A1 | 2/2003 | Bergman et al. |
| 2003/0071850 A1* | 4/2003 | Geidl .......................... 345/781 |
| 2003/0088633 A1 | 5/2003 | Chiu et al. |
| 2003/0093585 A1 | 5/2003 | Allan |
| 2003/0101201 A1 | 5/2003 | Saylor et al. |
| 2003/0101223 A1 | 5/2003 | Pace et al. |
| 2003/0105837 A1 | 6/2003 | Kamen et al. |
| 2003/0112948 A1 | 6/2003 | Brown et al. |
| 2003/0115186 A1 | 6/2003 | Wilkinson et al. |
| 2003/0120805 A1 | 6/2003 | Couts et al. |
| 2003/0154177 A1 | 8/2003 | Holland et al. |
| 2003/0182428 A1 | 9/2003 | Li et al. |
| 2003/0182461 A1 | 9/2003 | Stelting et al. |
| 2003/0187971 A1 | 10/2003 | Uliano et al. |
| 2003/0204741 A1 | 10/2003 | Schoen et al. |
| 2003/0208543 A1 | 11/2003 | Enete et al. |
| 2003/0217081 A1 | 11/2003 | White et al. |
| 2003/0220860 A1 | 11/2003 | Heytens et al. |
| 2003/0229722 A1 | 12/2003 | Beyda |
| 2003/0235279 A1 | 12/2003 | Richomme |
| 2004/0002958 A1 | 1/2004 | Seshadri et al. |
| 2004/0010543 A1 | 1/2004 | Grobman |
| 2004/0019695 A1 | 1/2004 | Fellenstein et al. |
| 2004/0030762 A1 | 2/2004 | Silverthorne et al. |
| 2004/0039776 A1 | 2/2004 | Ballard |
| 2004/0039800 A1 | 2/2004 | Black et al. |
| 2004/0049477 A1 | 3/2004 | Powers et al. |
| 2004/0054802 A1 | 3/2004 | Beauchamp et al. |
| 2004/0060001 A1 | 3/2004 | Coffen et al. |
| 2004/0073596 A1 | 4/2004 | Kloninger et al. |
| 2004/0087300 A1 | 5/2004 | Lewis |
| 2004/0146044 A1 | 7/2004 | Herkerdorf et al. |
| 2004/0152477 A1 | 8/2004 | Wu et al. |
| 2004/0254998 A1 | 12/2004 | Horvitz |
| 2005/0004984 A1 | 1/2005 | Simpson |
| 2005/0055329 A1 | 3/2005 | Bakalash et al. |
| 2005/0086211 A1 | 4/2005 | Mayer |
| 2005/0102294 A1 | 5/2005 | Coldewey |
| 2005/0102611 A1 | 5/2005 | Chen |
| 2005/0125377 A1 | 6/2005 | Kotler |
| 2006/0089939 A1 | 4/2006 | Broda et al. |
| 2006/0161540 A1 | 7/2006 | Schmitz et al. |
| 2006/0206589 A1 | 9/2006 | Lentini et al. |
| 2008/0043256 A1 | 2/2008 | Broda et al. |
| 2008/0046505 A1 | 2/2008 | Netsch et al. |
| 2008/0046506 A1 | 2/2008 | Broda |
| 2008/0046510 A1 | 2/2008 | Beauchamp et al. |
| 2008/0046536 A1 | 2/2008 | Broda |
| 2008/0046556 A1 | 2/2008 | Nicholls et al. |
| 2008/0046568 A1 | 2/2008 | Broda et al. |
| 2008/0046803 A1 | 2/2008 | Beauchamp et al. |
| 2008/0077656 A1 | 3/2008 | Broda |
| 2008/0148289 A1 | 6/2008 | Nicholls et al. |
| 2008/0155020 A1 | 6/2008 | Beauchamp et al. |
| 2009/0031205 A1 | 1/2009 | Aureglia et al. |
| 2009/0037803 A1 | 2/2009 | Bauchot |

OTHER PUBLICATIONS

"Steel-Belted Radius/Enterprise Edition", Funk Software, Inc., 2004.
"Scripting Support for Web Page Printing Sample," Microsoft Corporation, 2004.
"Jabber: About: Technology Overview", Jabber Software Foundation, Dec. 12, 2003.
"Report of Novelty Search," by Patentec, dated Oct. 16, 2003.
Jan Smith, "Browser Basics: Printing", Feb. 3, 2003.
Perfetti, Christine and Jared M. Spool, "Macromedia Flash: A New Hope for Web Applications", User Interface Engineering, 2002.
Aaron Weiss, "The Document Object Model Dissected", Jupitermedia Corporation, 2002.
"Protecting the Enterprise from Rogue Protocols", Akonix Systems, Inc., 2002.
"Informatica Applications: Leverage your Enterprise Information for Better Decision Making", Informatica Corporation, 2002.
"Informatica Applications: Informatica Customer Relationship Analytics", Informatica Corporation, 2002.
"Brocade Rapidly Implements Customer and Sales Analytics", Informatica Corporation, 2002.
Howlett, Dennis and Keith Rodgers, "Delivering Value Back to the Business: A Guide to Successful Portal Selection and Implementation", TIBCO Software, 2002.
"Sametime for iSeries 2.5", Lotus Software, IBM Corporation, 2002.
"Business Intelligence Software: Engendering a Quiet Revolution in the Business Place", MicroStrategy, Dec. 20, 2002.
"Print Without Pop Up Window Using Javascript," Experts Exchange, posted Nov. 3, 2002.
"Adding Printer Capabilities," Interactivetools.Com, posted Oct. 19, 2002.
Bob Woods, "CypherGuard Secures MSN, Windows IM", Instant Messaging Planet, JupiterMedia Corporation, Oct. 3, 2002.
"Business Transformation Through End-to-End Integration", IBM, Aug. 2002.
"The Sagent Analytic Advantage", Sagent Technology Inc., May 2002.
Thomas Loo and Martin Honnen, "How Can I Print a Document That is not Currently Loaded Into a Frame or Window," Synop Software, Apr. 24, 2002.
Jake Howlett, "Further Control of Printing," Codestore, Jan. 3, 2002.
Hugh J. Watson, "Recent Developments in Data Warehousing", Communications of the Association for Information Systems, vol. 8, 2001.
"The Business Intelligence Industry's Leading Products and Services", Business Objects, 2001.
Stephen Brewster, "Windowing Systems", Glasgow Interactive Systems Group, 2001.
Steve Cimino, "How Can I Print a Web Page in ASP?", Internet.Com Corp., posted Jul. 27, 2001.
"Express Communicator", White Paper, ACD Systems Ltd., May 2001.
"Business Rules: Powering Business and E-Business", White Paper, ILOG, May 2001.
"A Data Warehousing Tutorial", Paretoanalysts, Dec. 27, 2001.
"The Sagent Performance Story", Sagent Technology, Inc., Oct. 2001.
"Achieving Global Business Visibility with the webMethods Integration Platform", webMethods, Inc., Sep. 2001.
Bernstein, Philip A. and Erhard Rahm, "Data Warehouse Scenarios for Model Management", Microsoft Corporation, 2000.
"Implementing the RosettaNet eBusiness Standard: Automating High-tech Supply Chains using BusinessWare for RosettaNet", Vitria Technology Inc., 2000.
Wang, Wenjie and Jiaying Pan, "Instant Messaging Insight", Computer Science Department, New York University, Nov. 22, 2000.
"X Window System: Getting Started", Stanford University, Oct. 26, 2000.
"JavaScript: MSIE 5 Unable to Print Child Window," Expets Exchange, posted Jun. 7, 2000.
Andrew Nosenko, "Scripting Support for Web Page Printing," Microsoft Corporation, Mar. 28, 2000.
Mark Day et al., "A Model for Presence and Instant Messaging", Network Working Group, Request for Comments 2778, The Internet Society, Feb. 2000.
"The Basics of Broswer", Santa Clara County Office of Education Internet Institute (SCCOE), 1999.
Ramu Movva and William Lai, "MSN Messenger Service 1.0 Protocol," Internet Draft, Aug. 1999. (19 pages).
Randy Corke, "Keeping Data Warehouses Current: Automating Incremental Updates With Data Movement", DM Direct, May 1999.
Moran, Brian and Russ Whitney, "Getting to Know OLAP and MDX", Windows IT Pro, Instant Doc #5112, Apr. 1999.
Mark Handley et al., "SIP: Session Initiation Protocol", Networking Working Group, Request for Comments 2543, The Internet Society, Mar. 1999.
"MQSeries link for R/3", International Business Machines Corporation, 1998.
Michael Tsai, "The Personal Computing Paradigm", ATPM Inc., 1998.

Arno Schoedl, "Issues for Implementing User Interface Software", Georgia Institute of Technology, Sep. 26, 1998.
Tristan Richardson and Kenneth R. Wood, "The RFB Protocol," ORL Cambridge, Jul. 16, 1998. (26 pages).
Allan Christian Long et al., "PDA and Gesture Use in Practice: Insights for Designers of Pen-based User Interfaces", University of California at Berkeley, 1997.
"Middleware—The Essential Component for Enterprise Client/Server Applications", International Systems Group, Inc., Feb. 1997.
Nicolas Pioch, "A Short IRC Primer", Jan. 1, 1997.
Constantine Stephanidis et al., "Design Representations and Development Support for User Interface Adaptation", Institute of Computer Science Foundation for Research and Technology, 1995.
Allen Gwinn, "Simple Network Paging Protocol—Version 3—Two-Way Enhanced," Network Working Group, Oct. 1995. (23 pages).
"An Introduction to Messaging and Queuing", IBM Corp, Jun. 1995.
"Relational OLAP: An Enterprise-Wide Data Delivery Architecture", MicroStrategy, Incorporated, 1994.
Jarkko Oikarinen and Darren Reed, "Internet Relay Chat Protocol," Nerwork Working Group, May 1993. (58 pages).
"Guidelines for Implementing and Using the NBS Data", Federal Information Processing Standards, Publication 74, Apr. 1, 1981.
"ILOG Views 2D Graphics: The C++ Library for Interactive 2D Graphics", ILOG.
"Sametime 3 Features and Benefits", IBM publication, date unknown (1 page).
U.S. Appl. No. 10/289,142, filed Nov. 5, 2002, Nicholls et al.
U.S. Appl. No. 10/289,155, filed Nov. 5, 2002, Netsch et al.
U.S. Appl. No. 10/289,231, filed Nov. 5, 2002, Powers et al.
U.S. Appl. No. 10/290,945, filed Mar. 17, 2003, Broda et al.
U.S. Appl. No. 10/390,978, filed Mar. 17, 2003, Beauchamp et al.
U.S. Appl. No. 10/391,128, filed Mar. 17, 2003, Broda et al.
U.S. Appl. No. 10/391,544, filed Mar. 17, 2003, Broda.
U.S. Appl. No. 10/452,665, filed May 30, 2003, Broda.
U.S. Appl. No. 11/763,134, filed Jun. 14, 2007, Broda.
Using Microsoft Excel 97 Manual. Bestseller Edition. Que Corporation, 1997.
Microsoft Excel Print Screen Images (figs. 1-6).
"Introduction to Dynamic HTML," printed from Microsoft.com.
Excel 2000, publ. by Microsoft in 1999, screen captures pp. 1-12.
Extensible Markup Language (XML) 1.0 (Second Edition), Oct. 6, 2000, printed from w3.org.
Dabke, P, "Enterprise Integration Via Corba-Based Information Agents," IEEE Internet Computing, Sep./Oct. 1999, pp. 49-57, vol. 3, Issue 5.
Goldsmith, D. et al., "UTF-7: A Mail-Safe Transformation Format of Unicode," Network Working Group, Request for Comments: 2152, Obsoletes: RFC 1642, Category: Informational, May 1997, pp. 1-15.
Habraken, J. "Ten Minute Guide to Microsoft Excel 2002," Sep. 27, 2001, Que, Section, "Lesson 6, Performing Calculations with Functions."
Karn, P. et al., "The ESP Triple DES Transform," Network Working Group, Request For Comments: 1851, Category: Experimental, Sep. 1995, pp. 1-11.
Roman, S. "Writing Excel Macros with VBA: Second Edition," Jun. 25, 2002, Chapter 6: Functions and Subroutines.
Ünal, A., "Electronic Commerce and Multi-enterprise Supply/Value/Business Chains," Information Sciences, Aug. 2000, pp. 63-68, vol. 127, Issues 1-2, NH Elsevier.
Office Action for U.S. Appl. No. 10/237,559, dated Feb. 1, 2008, 12 pages total.
Office Action for U.S. Appl. No. 10/289,155, dated Jan. 29, 2008, 14 pages total.
Office Action for U.S. Appl. No. 10/289,155, dated Jul. 28, 2008, 10 pages total.
Office Action for U.S. Appl. No. 10/289,162, dated Nov. 30, 2007, 12 pages total.
Office Action of U.S. Appl. No. 10/289,231, dated Nov. 6, 2008, 10 pages total.
Office Action of U.S. Appl. No. 10/289,231 dated Apr. 30, 2009, 10 pages total.
Office Action for U.S. Appl. No. 10/390,978, dated Mar. 5, 2009, 19 pages total.
Office Action for U.S. Appl. No. 10/390,978, dated Sep. 4, 2009, 24 pages total.
Office Action for U.S. Appl. No. 10/391,128, dated Oct. 6, 2008, 19 pages total.
Office Action for U.S. Appl. No. 10/391,128, dated May 13, 2009, 18 pages total.
Office Action for U.S. Appl. No. 10/391,128, dated Oct. 27, 2009, 19 pages total.
Office Action for U.S. Appl. No. 10/391,544, dated Sep. 17, 2008, 14 pages total.
Office Action for U.S. Appl. No. 10/391,544, dated Aug. 28, 2009, 17 pages total.
Office Action for U.S. Appl. No. 11/299,441, dated Feb. 5, 2008, 21 pages total.
Office Action for U.S. Appl. No. 11/299,441, dated Sep. 11, 2009, 22 pages total.
Anton, Jesse et al., "Web Catching for Database Applications with Oracle Cache", Jun. 4-6, 2002, pp. 594-599.
Office Action for U.S. Appl. No. 10/390,978, dated Sep. 1, 2005, 15 pages total.
Final Office Action for U.S. Appl. No. 10/390,978, dated May 18, 2006, 13 pages total.
Office Action for U.S. Appl. No. 10/390,978, dated Feb. 21, 2007, 16 pages total.
Final Office Action for U.S. Appl. No. 10/390,978, dated Jun. 25, 2007, 17 pages total.
Office Action for U.S. Appl. No. 10/390,978, dated Jan. 9, 2008, 5 pages total.
Final Office Action for U.S. Appl. No. 10/390,978, dated Sep. 3, 2008, 17 pages total.
Advisory Action for U.S. Appl. No. 10/390,978, dated Nov. 3, 2008, 3 pages total.
Final Ofice Action for U.S. Appl. No. 10/390,978, dated Sep. 4, 2009, 24 pages total.
Office Action for U.S. Appl. No. 10/390,978, dated Dec. 14, 2009, 25 pages total.
Office Action of U.S. Appl. No. 10/289,231, dated Dec. 9, 2005, 17 pages total.
Final Office Action of U.S. Appl. No. 10/289,231, dated Apr. 11, 2006, 15 pages total.
Office Action of U.S. Appl. No. 10/289,231, dated Nov. 30, 2006, 13 pages total.
Final Office Action of U.S. Appl. No. 10/289,231, dated Apr. 16, 2007, 15 pages total.
Office Action of U.S. Appl. No. 10/289,231, dated Apr. 15, 2008, 12 pages total.
Final Office Action of U.S. Appl. No. 10/289,231, dated Dec. 14, 2009, 9 pages total.
Office Action for U.S. Appl. No. 10/289,155, dated May 18, 2006; 11 pages total.
Final Office Action for U.S. Appl. No. 10/289,155, dated Mar. 27, 2007; 12 pages total.
Advisory Action for U.S. Appl. No. 10/289,155, dated May 31, 2007; 3 pages total.
Office Action for U.S. Appl. No. 10/289,155, dated Aug. 6, 2007; 11 pages total.
Advisory Action for U.S. Appl. No. 10/289,155, dated Apr. 14, 2008; 3 pages total.
Final Office Action for U.S. Appl. No. 10/289, 155, dated Jan. 6, 2009; 11 pages total.
Notice of Allowance for U.S. Appl. No. 10/289,155, dated Jun. 11, 2009; 9 pages total.
Notice of Allowance for U.S. Appl. No. 10/289,155, dated Sep. 29, 2009; 7 pages total.
Office Action for U.S. Appl. No. 10/391,128, dated Jul. 20, 2007, 9 pages total.
Final Office Action for U.S. Appl. No. 10/391,128, dated Mar. 19, 2008, 12 pages total.
Advisory Action for U.S. Appl. No. 10/391,128, dated Jul. 21, 2008, 3 pages total.
Advisory Action for U.S. Appl. No. 10/391,128, dated Jul. 20, 2009, 3 pages total.

*Office Action for* U.S. Appl. No. 10/391,544, dated Sep. 8, 2006, 12 pages total.
*Advisory Action for* U.S. Appl. No. 10/391,544, dated Dec. 3, 2008, 6 pages total.
*Office Action for* U.S. Appl. No. 10/391,544, dated Feb. 3, 2009, 16 pages total.
*Advisory Action for* U.S. Appl. No. 10/391,544, dated Dec. 11, 2009, 2 pages total.
*Notice of Allowance for* U.S. Appl. No. 10/391,544, dated Mar. 25, 2010, 12 pages total.
*Office Action for* U.S. Appl. No. 10/452,665, dated Dec. 7, 2006, 8 pages total.
*Final Office Action for* U.S. Appl. No. 10/452,665, dated May 9, 2007, 7 pages total.
*Final Office Action for* U.S. Appl. No. 11/299,441, dated Oct. 3, 2008, 18 pages total.
*Advisory Action for* U.S. Appl. No. 11/299,441, dated Dec. 16, 2008, 3 pages total.
*Office Action for* U.S. Appl. No. 11/299,441, dated Feb. 4, 2009, 19 pages total.
*Office Action for* U.S. Appl. No. 11/299,441, dated Jan. 5, 2010, 27 pages total.

* cited by examiner

TRANSPARENT WINDOWS METHODS AND APPARATUS THEREFOR

BACKGROUND OF THE INVENTION

The present invention relates in general to interactive graphical computing environment. More particularly, the present invention relates to methods and apparatus for optimizing a transparent window.

Many early operating systems (i.e., MS DOS) could only run a single application. It was therefore possible, if not necessary, to allow the application to be directly coupled to the computer's hardware resources, such as the keyboard and video display. Primarily comprising a text-based interface, these applications received relatively little assistance from the operating system. For example, the application would directly poll the keyboard for any user keystrokes.

In contrast, most modern graphical operating systems (i.e. Microsoft Windows, Linux, MacOS, etc.) can simultaneously run multiple applications. Hence some sort of shared messaging system must be used to preclude resource sharing conflicts. User input is no longer polled by the application, but rather the application registers with the operating system, usually during installation, describing the forms of input that it would like to receive. The operating system, in turn, forwards messages to the application as appropriate. Likewise, any output to the display area or printer was also routed through the message system to the appropriate portion of the operating system (i.e., the typing of text, the scrolling of a mouse, or the resizing of the application window).

Display windows are common characteristic of most graphical operating systems. A window is a virtual entity, commonly referred to as a control, positioned on a computer display, for presenting the interaction between the user and the computer. The typical application has a single rectangular window displayed on the screen. However, some applications open multiple windows, and others permit arbitrarily shaped windows (not just rectangles) and windows of various styles and colors.

Computer platforms are also becoming smaller, faster, mobile, and more ubiquitous. Mobile, handheld computers; computing appliances; and smart telephones allow computer support to be built into task situations. Such situations include new physical environments, where computers have been impractical up to now, and also new social environments, where, previously, computers imposed a formidable barrier to social interaction. However, traditional user interface devices can be problematic. Keyboards are often awkward and bulky to carry, while the mouse (and other cursor-based input) is generally not optimized for entering text efficiently.

Pen-based computing developed as an alternative means of user input, comprising the functions of both the keyboard and the stylus. Most pen-based devices allow annotation directly on the screen display, much like the annotation of a physical sheet of paper with a marker. Furthermore, these platforms may also convert a user's handwritten notes into computer recognized text and commands. Many pen-based devices also run existing applications. For example, the Microsoft TabletPC, based on the XP platform, can run just about any XP application, However, most applications must generally be specifically designed to take advantage of pen-based user input. Many previously written applications, such as an Internet browser, often do not allow direct annotation in the browser window. For instance, if two users are visually sharing a browser application, such as with Microsoft NetMeeting, it may be difficult, if not impossible, for a user to annotate directly on the browser display area.

In view of the foregoing, there is desired a method and apparatus for optimizing pen-based annotations on a window of a software application.

SUMMARY OF THE INVENTION

The invention relates, in one embodiment, to a method for optimizing pen-based annotations on a non-pen enabled window. The method includes starting a visible non-pen-enabled window further including position indicia and size indicia; starting a transparent pen-enabled window; and associating the visible non-pen-enabled window with the transparent pen-enabled window based on the position indicia and size indicia. The method further includes aligning the transparent pen-enabled window with the visible non-pen-enabled window, and accepting user input comprising a message. If the message further includes pen indicia, the method also includes forwarding the message to the transparent pen-enabled window. Else, the method includes forwarding the message to the first application.

In another embodiment, the invention relates to an apparatus for pen-based annotations on a non-pen enabled window. The apparatus includes a means of starting a visible non-pen-enabled window further including position indicia and size indicia; a means of starting a transparent pen-enabled window; and a means of associating the visible non-pen-enabled window with the transparent pen-enabled window based on the position indicia and size indicia. The apparatus further includes a means of aligning the transparent pen-enabled window with the visible non-pen-enabled window, and a means of accepting user input comprising a message. If the message further includes pen indicia, the apparatus also includes a means of forwarding the message to the transparent pen-enabled window. Else, the apparatus includes a means of forwarding the message to the first application.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

In accordance with one embodiment of the present invention, a transparent window is advantageously employed to optimize pen-based annotation on a window of a software application.

Many software applications, including the operating system itself, comprise a set of windows. The Microsoft Windows desktop, for instance, functions as a large window. Normally, the operating system maintains and provides spatial information for each window in its desktop area. As windows overlap each other (e.g. windows have a Z order relative to the user), each application responds by redrawing its own window (or portion thereof) when unobstructed.

Most modern operating systems, like Linux, are also event driven. Rather than being a based upon a constant course of action (i.e., MS DOS), various system events are handled by a set of operating system routines. For example, the movement of a mouse or the redrawing of a screen. At the core is a loop—a portion of code that gets executed time and again throughout the life of the program. The sole job of the main loop, often called a message pump, is to make sure that events get handled, such as being forwarded to the appropriate program.

Messages are used for most basic interactions between applications and the operating system. If a user wants a window or control (which is just a specialized window) to do something, a message is sent. If an event happens such as the user typing on the keyboard, moving the mouse, clicking a button, then messages are sent by the system to the windows affected. If the message is not recognized, it is often ignored.

For example, in Microsoft Windows, a simplified example of the message pump is:

```
while(GetMessage(Message)
{
    TranslateMessage (Message);
    DispatchMessage (Message);
}
```

The message loop calls GetMessage( ), which looks in a message queue. When an event occurs causing a message to be added to the queue (i.e., a mouse click). GetMessages( ) returns a positive value indicating there is a message to be processed, and places the appropriate information into the Message variable. It is then passed to TranslateMessage( ) for additional processing (i.e., translating virtual key messages into character messages). The message is then passed to DispatchMessage( ) which determines the window for which it is intended. It then forwards a message to the application associated with the window, sending the handle of the window, the original received message, and other parameters. A handle is a unique identifier or pointer that is used to access an object, similar to an index number. Whenever a program or resource needs to access another resource, its presents the handle to the appropriate application programming interface, or API.

In order to substantially mimic the behavior of a regular pen, pen-based computer input generally must account for additional attributes, such as the angle of the pen, pressure on the writing surface, pen speed, steadiness, in-air movements, and others. Traditional operating systems generally, however, do not generally expose or use these pen characteristics. For example, with Microsoft Windows XP Tablet PC Edition, the infrastructure that makes the pen work consists of a pen service that sends out system or pen events that correspond to pen actions. The service determines whether the destination is a pen-enabled application or a mouse-enabled application, or whether the destination is a control or a window within an application. The service then sends a mouse message to the mouse application or control or both mouse and pen messages to a pen-enabled application.

In a non-obvious manner, the current invention allows a transparent pen-enabled window to be superimposed upon a non-pen-enabled window. In a fashion similar to laying a sheet of transparency over a sheet of paper, the user can make annotations on the transparent pen-enabled window directly over displayed elements of the underlying window. For example, a user could directly annotate on an existing presentation application, such as on a Microsoft PowerPoint slide. In one embodiment, the non-pen-enabled window is included in a collaboration application, such as with Microsoft NetMeeting. In another embodiment, a single application comprises both the transparent pen-enabled window and a non-pen-enabled window, such as with Iteration Active Studio or Active Viewer. In yet another embodiment, a first application including a transparent pen-enabled window is coupled to a second application including a non-pen-enabled window.

Figure 1A:
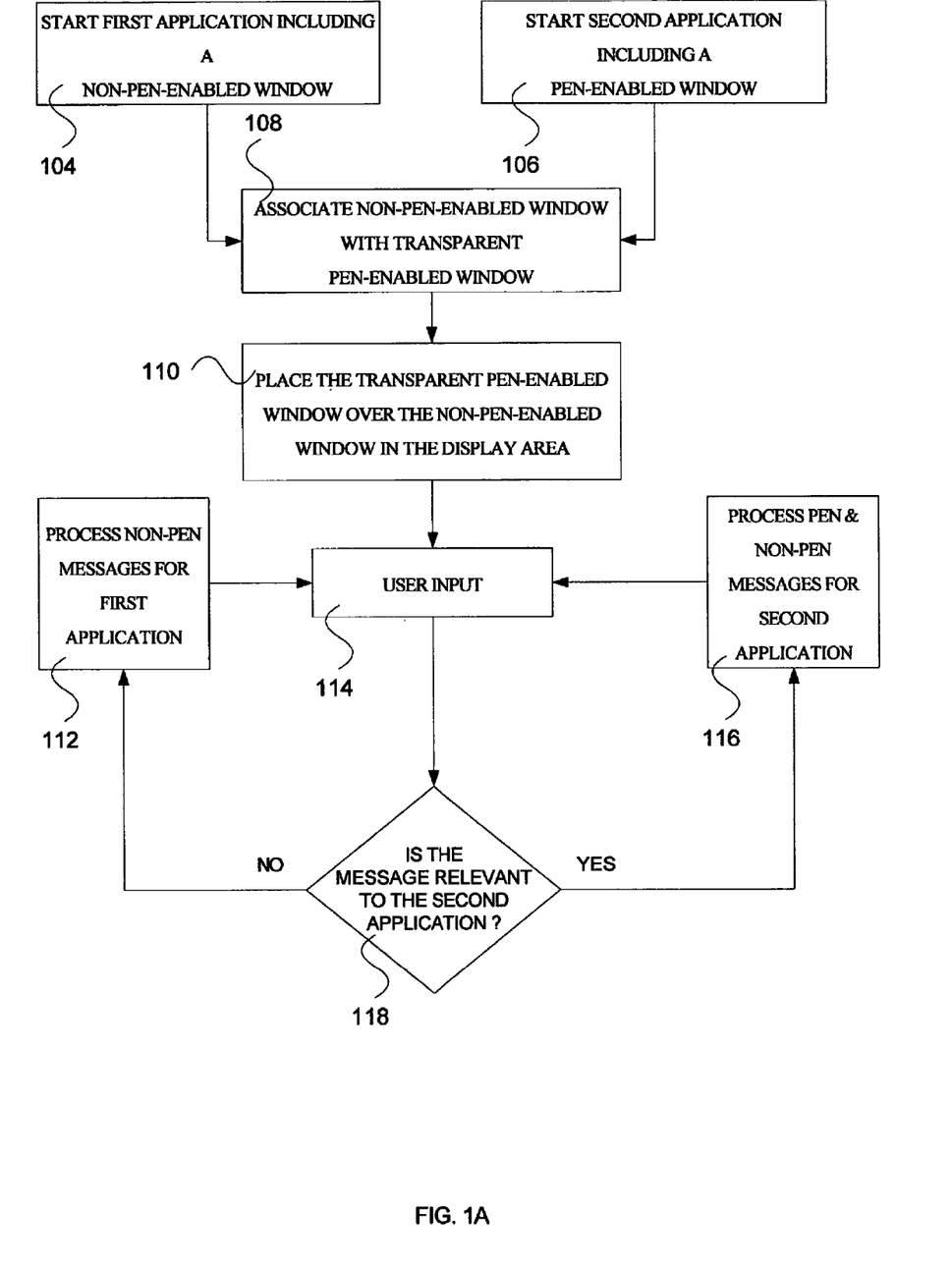
FIG. 1A illustrates, in accordance with one embodiment of the present invention, a simplified diagram in which pen-based annotations are enabled on a previously non-pen enabled window.

FIG. 1A depicts a simplified diagram according to one embodiment of the invention, in which pen-based annotations are enabled on a previously non-pen enabled window. In a non-obvious fashion, a transparent pen enabled window of a first application is coupled to a visible non-pen enabled window of a second application.

The first application may register itself with the operating system, requesting receipt of all pen messages generated by the user on the transparent window. These messages can describe pen angle, writing surface pressure, pen speed, etc. In one embodiment, the messages can be converted to a bitmap. In another embodiment, the messages are converted to a set of Bezier curves for efficient storage. In another embodiment, the messages are converted to a Microsoft Ink format. In another embodiment, the messages are converted to computer-readable characters through a handwriting recognition process.

Messages not relevant to the first application are ignored and subsequently received and processed by the second application in a normal fashion. For example, when a user selects a button control on the second application, a mouse click message is generated. The first application's transparent window, positioned before the second application's visible window, receives the mouse click message. Since it is not interested in mouse click messages, the message is instead is returned to the message pump. It is subsequently ignored by the first application, and received by the second application, wherein the mouse click message is associated with the button control. The screen is refreshed, and the user sees the appropriate button selection behavior (e.g. the mouse control being depressed and released).

In order to synchronize its movement to the underlying visible window, the first application requests the position and size of the visible window from the operating system. As the underlying visible window subsequently moves, or is resized, the pen-enabled transparent window moves or resizes as well. Furthermore, the first application can instruct the second application to redraw itself, through a refresh message, whenever a portion of the window becomes obstructed or unobstructed by another window, other than the transparent window, on the desktop.

Referring now to FIG. 1A, a first application including a non-pen-enabled window is started at step 104. Likewise, a second application including a pen-enabled window is started at step 106. The non-pen-enabled window and the transparent pen-enabled window are then associated at step 108. That this, the second application requests from the operating system information describing the position and size of the non-pen-enabled window. The transparent pen-enabled window is then instantiated and positioned over the non-pen-enabled window in the display area at step 110. User input is then generated at step 114. At step 118, the message is analyzed to determine if it is relevant to the second application. If so, at step 116, the message is forwarded to the second application, where it is processed. If not, at step 112, the message is forwarded to the first application, where it is processed. In either case, the system is again ready for additional user input at step 114.

Figure 1B:
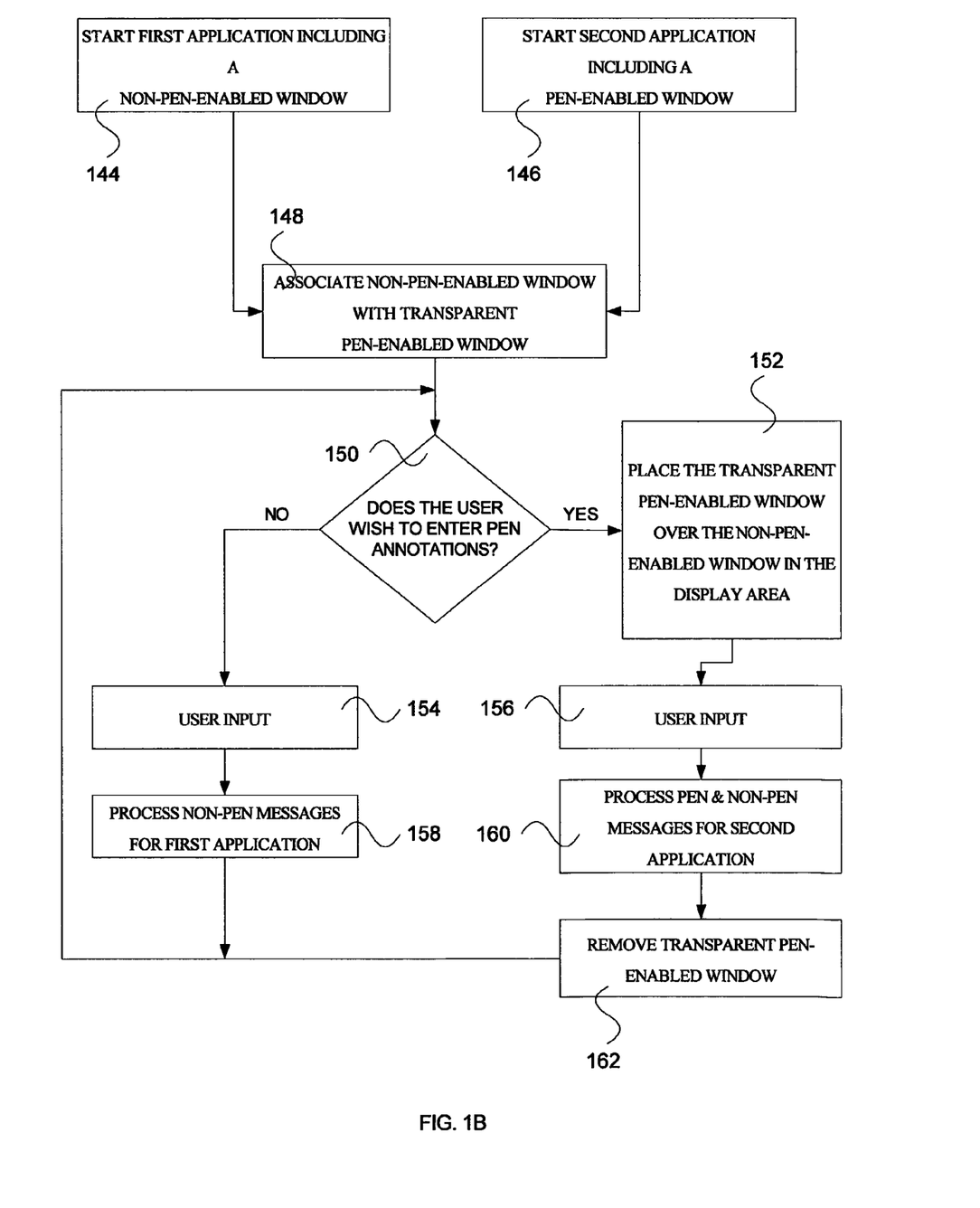
FIG. 1B illustrates, in accordance with one embodiment of the present invention, a simplified diagram in which pen-based annotations are enabled on a previously non-pen enabled window that cannot be automatically refreshed.

FIG. 1B depicts a simplified diagram according to one embodiment of the invention, in which pen-based annotations are enabled on a previously non-pen enabled window that cannot be automatically refreshed. Some applications, such as Microsoft Internet Explorer, will ignore refresh requests from other applications, in order to optimize performance. That is, the application, itself, will determine the situations in which it will refresh its own windows. However, appropriate control behavior, such as the depression of a button or the rendering of a data stream, usually requires periodic screen refreshments. If a first window is positioned above a second non-pen-enabled window, even if the first window is transparent, the underlying second window may choose not to refresh. This may freeze the display area, and effectively disable the user controls, such as buttons and scrollbars.

In a non obvious fashion, the first application captures an image of the visible non-pen enabled window, effectively making the previously transparent window opaque. The user can then annotate on this opaque window as before. In one embodiment, when the user desires to access controls on the visible non-pen enabled window, the opaque window becomes transparent and moves behind the visible non-pen enabled window. In another embodiment, when the user desires to access controls on the visible non-pen enabled window, the opaque window is moved off the visible desktop.

Referring now to FIG. 1B, a first application including a non-pen-enabled window is started at step 144. Likewise, a second application including a pen-enabled window is started at step 146. The non-pen-enabled window and the transparent pen-enabled window are then associated at step 148. That this, the second application requests from the operating system information describing the position and size of the non-pen-enabled window. A decision is made at step 150, in which the user selects to enter pen annotations, or non-pen annotations (i.e., such as a mouse click). If yes, a transparent pen-enabled window is then instantiated and positioned over the non-pen-enabled window in the display area at step 152. User input is then generated at step 156. At step 160, the messages are forwarded to the second application, where they are processed. At step 162, the transparent window is removed, and the loop restarts at step 150. If not, at step 150, user input is then generated at step 154. At step 158, the messages are forwarded to the first application, where they are processed, and the loop restarts at step 150.

Figure 2:
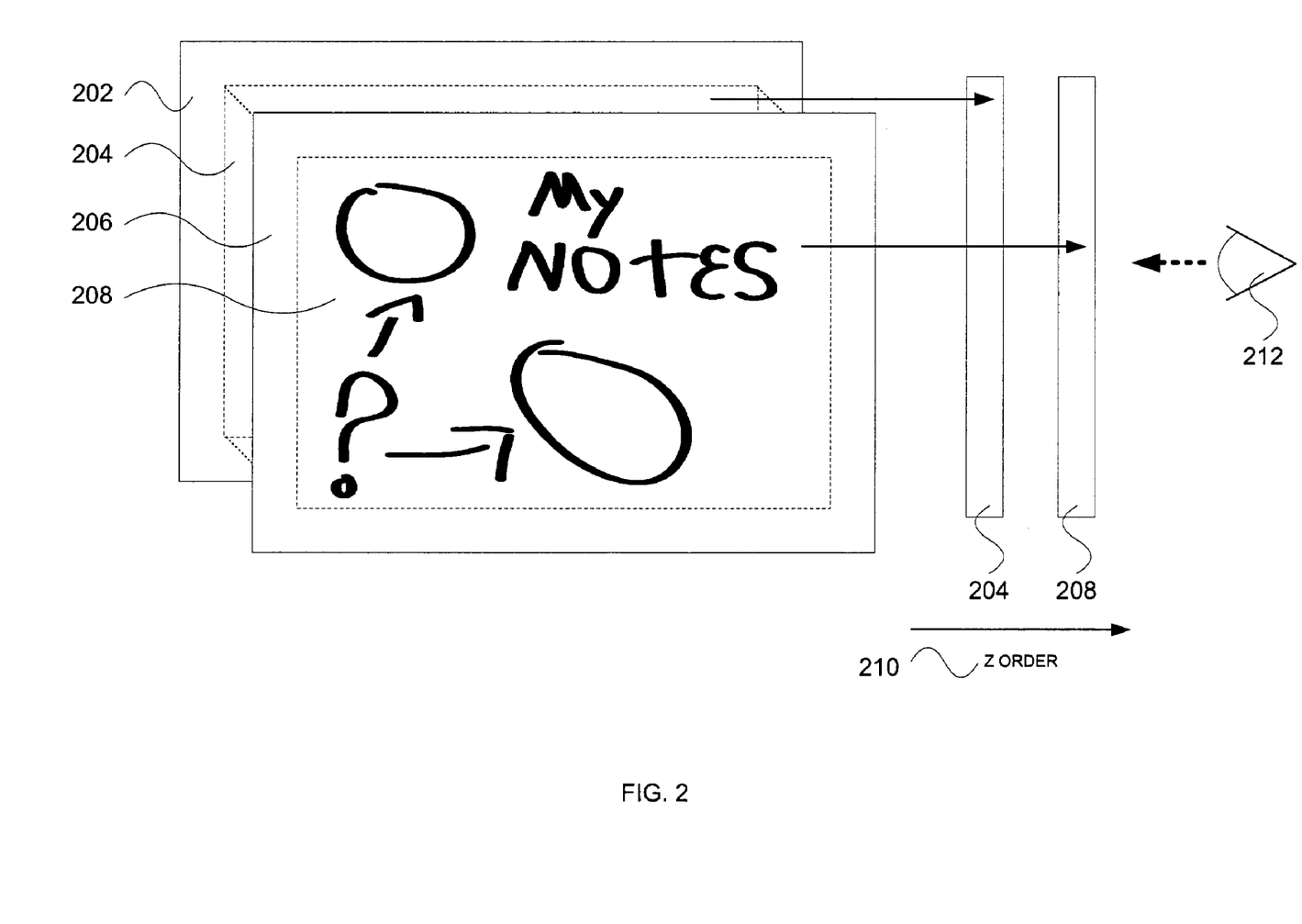
FIG. 2 illustrates, in accordance with one embodiment of the present invention, a graphical representation of the screen displays of FIGS. 1A-1B.

Referring now to FIG. 2, a graphical representation of a screen display is shown of the simplified diagrams of FIGS. 1A-B. The first application is shown as 202, whereas the included non-pen-enabled visible window is shown as 204. These, in turn, are coupled to a second application 206, and the included transparent pen-enabled window is shown as 208. Transparent pen-enabled window 208 is positioned over the visible non-pen-enabled window relative to the user's viewpoint 212. That is, the transparent pen-enabled window has a higher Z order 210 in relationship to the visible non-pen-enabled window.

Figure 3:
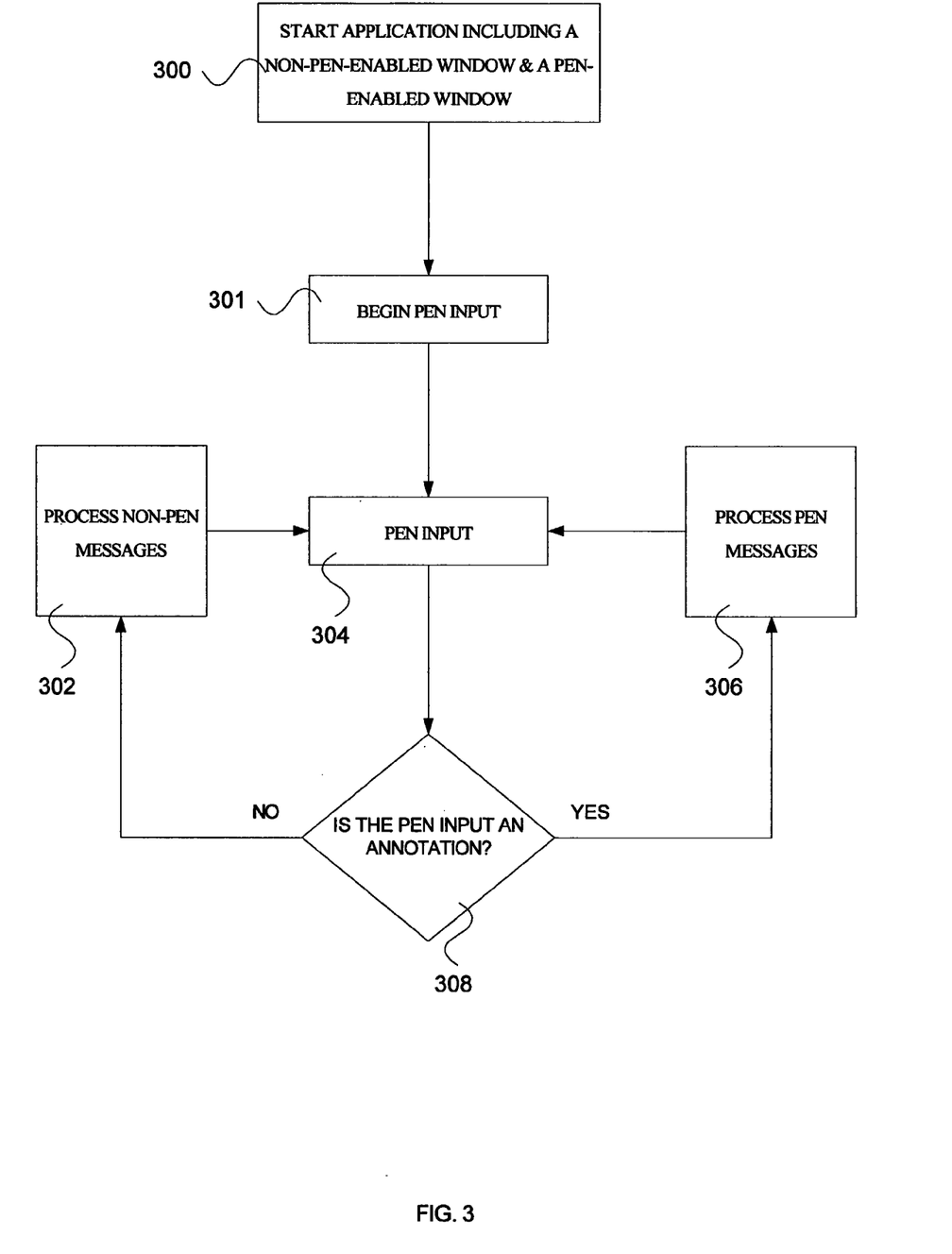
FIG. 3 illustrates, in accordance with one embodiment of the present invention, a simplified diagram in which pen-based annotations are enabled in an application that comprises both a pen-enabled window and a non-pen-enabled window; and, FIG. 4 illustrates, in accordance with one embodiment of the present invention, a graphical representation of the screen display of FIG. 3.

FIG. 3 depicts a simplified diagram according to one embodiment of the invention, in which pen-based annotations are enabled in an application that comprises both a pen-enabled window and a non-pen-enabled window. The application including is started at step 300. The transparent pen-enabled window is then instantiated and may be automatically positioned over the non-pen-enabled window. For example, a Windows application that has and embedded Internet Explorer control (which is not commonly pen-enabled) and a transparent pen-enabled window control. There is no need to associate both windows, since both are within the same application. User input is then generated at step 304. At step 308, the message is analyzed to determine if it is a pen message. If yes, at step 306, the message is forwarded to the pen message handler of the application, where it is processed. If not, at step 302, the message is forwarded to the non-pen message handler of the application, where it too is processed. In either case, the system is again ready for additional user input at step 304.

Figure 4:
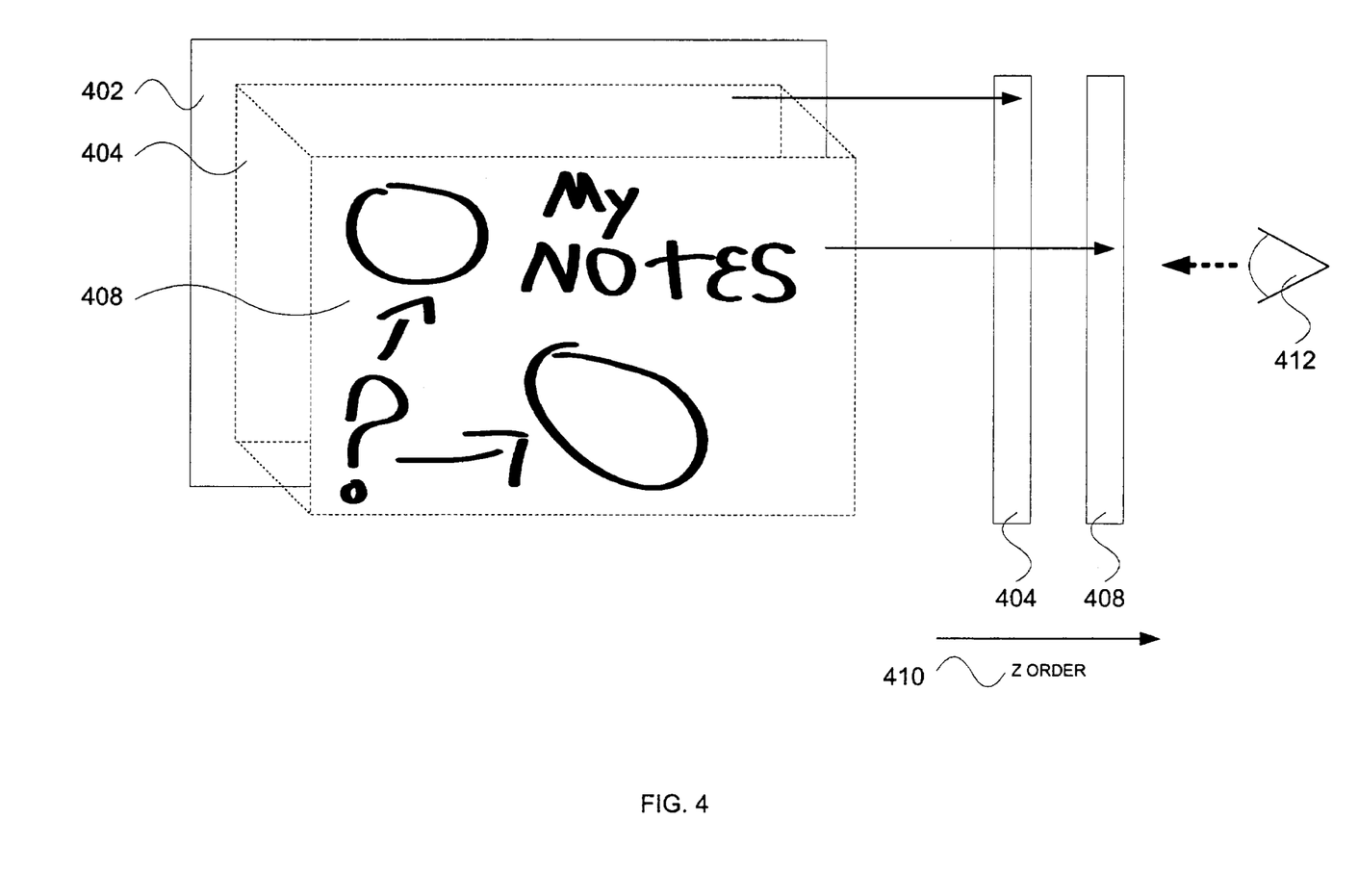

Referring now to FIG. 4, a graphical representation of a screen display is shown of the simplified diagram of FIG. 3. Unlike FIG. 2, there is only a single application 402 that includes a non-pen-enabled visible window 404, and a transparent pen-enabled window 408. Transparent pen-enabled window 408 is positioned over the visible non-pen-enabled window 404 relative to the user's viewpoint 412. That is, the transparent pen-enabled window has a higher Z order 410 in relationship to the visible non-pen-enabled window.

While this invention has been described in terms of several preferred embodiments, there are alterations, permutations, and equivalents which fall within the scope of this invention. For example, although reference is given to the Microsoft TabletPC, it should be understood that the invention can also integrate with other computer platforms and operating systems. It should also be noted that there are many alternative ways of implementing the apparatuses of the present invention. It is therefore intended that the following appended claims be interpreted as including all such alterations, permutations, and equivalents as fall within the true spirit and scope of the present invention.

Advantages of the invention include optimizing pen-based annotations on a window of a software application. Additional advantages enhancing existing non-pen-based applications with pen annotation capability.

Having disclosed exemplary embodiments and the best mode, modifications and variations may be made to the disclosed embodiments while remaining within the subject and spirit of the invention as defined by the following claims.

What is claimed is:

1. A method of optimizing pen-based annotations on a non-pen enabled window comprising:
   providing a first application associated with a visible non-pen-enabled window including position indicia, size indicia, and order indicia;
   providing a second application associated with a transparent pen-enabled window including position indicia, size indicia, and order indicia;
   associating said visible non-pen-enabled window with said transparent pen-enabled window based on said position indicia and size indicia;
   receiving a first user input from a first input source of a plurality of input sources, the plurality of input sources including a pen input device and a non-pen input device;
   accepting the first user input;
   determining a source of the first user input;
   forwarding said first user input to said second application using the transparent pen-enabled window and adjusting the order indicia of at least one of the visible non-pen-enabled window or the transparent pen-enabled window to position the transparent pen-enabled window over the visible non-pen-enabled window in response to determining that the source of the first user input is the pen input device;
   receiving a second user input from a second input source of the plurality of input sources;
   accepting the second user input;
   determining a source of the second user input; and
   forwarding said second user input to the first application using the visible non-pen-enabled window and adjusting the order indicia of at least one of the visible non-pen-enabled window or the transparent pen-enabled window to position the visible non-pen-enabled window over the transparent pen-enabled window in response to determining that the source of the second user input is the non-pen input device.

2. The method of claim 1, where said transparent pen-enabled window comprises a transparent control.

3. The method of claim 2, where said non-pen enabled window comprises a non-transparent control of a collaborative application.

4. The method of claim 3, where said non-pen enabled window comprises a button.

5. The method of claim 4, where said non-pen enabled window comprises a browser.

6. The method of claim 4, where said non-pen enabled window comprises a menu.

7. The method of claim 1 further comprising registering the second application with an operating system for receiving pen messages.

8. The method of claim 7 wherein pen messages describe pen angle, writing surface pressure, or pen speed.

9. A method of optimizing pen-based annotations on a non-pen enabled window comprising:
   providing a visible non-pen-enabled window including position indicia and size indicia;
   providing a transparent pen-enabled window including position indicia and size indicia;
   accepting user input;
   receiving a first user input from a first input source of a plurality of input sources, the plurality of input sources including a pen input device and a non-pen input device;
   determining a source of the first user input;
   aligning the transparent pen-enabled window over the visible non-pen-enabled window based on the position indicia and the size indicia;
   forwarding the first user input to a first handler of an application, the first handler configured to process pen messages in response to determining that the source of the first user input is the pen input device;
   receiving a second user input from a second input source of the plurality of input sources;
   determining a source of the second user input; and
   forwarding the second user input to a second handler of the application, the second handler configured to process non-pen messages and moving said transparent pen-enabled window such that said transparent pen-enabled window is no longer aligned over said visible non-pen-enabled window in response to determining that the source of the second user input is the non-pen input device.

10. The method of claim 9, where said transparent pen-enabled window comprises a transparent control.

11. The method of claim 9, where said non-pen enabled window comprises a non-transparent control of a collaborative application.

12. The method of claim 11, wherein said moving said transparent pen-enabled window includes at least one of placing said transparent pen-enabled window in a lower Z-order than said visible non-pen-enabled window and removing said transparent pen-enabled window from a visible desktop.

13. The method of claim 12, where said non-pen enabled window comprises a browser.

14. The method of claim 13, where said non-pen enabled window comprises a menu.

15. An apparatus for optimizing pen-based annotations on a non-pen enabled window comprising:
   a means of providing a first application associated with a visible non-pen-enabled window including position indicia, size indicia, and order indicia;
   a means of providing a second application associated with a transparent pen-enabled window including position indicia, size indicia, and order indicia;
   a means of associating said visible non-pen-enabled window with said transparent pen-enabled window based on said position indicia and size indicia;
   a means of receiving a first user input from a first input source of a plurality of input sources, the plurality of input sources including a pen input device and a non-pen input device;
   a means of accepting the first user input;
   a means of determining a source of the first user input;
   a means of forwarding said first user input to said second application using the transparent pen-enabled window and adjusting the order indicia of at least one of the visible non-pen-enabled window or the transparent pen-enabled window to position the transparent pen-enabled window over the visible non-pen-enabled window in response to determining that the source of the first user input is the pen input device;
   a means of receiving a second user input from a second input source of the plurality of input sources;
   a means of accepting the second user input;
   a means of determining a source of the second user input; and
   a means of forwarding said second user input to the first application using the visible non-pen-enabled window and adjusting the order indicia of at least one of the visible non-pen-enabled window or the transparent pen-enabled window to position the visible non-pen-enabled window over the transparent pen-enabled window in response to determining that the source of the second user input is the non-pen input device.

16. The apparatus of claim 15, where said transparent pen-enabled window comprises a transparent control.

17. The apparatus of claim 15, where said non-pen enabled window comprises a control.

18. The apparatus of claim 15, where said non-pen enabled window comprises a button.

19. The apparatus of claim 15, where said non-pen enabled window comprises a browser.

20. The apparatus of claim 15, where said non-pen enabled window comprises a menu.

21. An apparatus for optimizing pen-based annotations on a non-pen enabled window comprising:
 a means of providing a visible non-pen-enabled window including position indicia and size indicia;
 a means of providing a transparent pen-enabled window including position indicia and size indicia;
 a means of accepting user input;
 a means of receiving a first user input from a first input source of a plurality of input sources, the plurality of input sources including a pen input device and a non-pen input device;
 a means of determining a source of the first user input;
 a means of aligning the transparent pen-enabled window over the visible non-pen-enabled window based on the position indicia and the size indicia;
 a means of forwarding the first user input to a first handler of an application, the first handler configured to process pen messages in response to determining that the source of the first user input is the pen input device;
 a means of receiving a second user input from a second input source of the plurality of input sources;
 a means of determining a source of the second user input; and
 a means of forwarding the second user input to a second handler of the application, the second handler configured to process non-pen messages and moving said transparent pen-enabled window such that said transparent pen-enabled window is no longer aligned over said visible non-pen-enabled window in response to determining that the source of the second user input is the non-pen input device.

22. The apparatus of claim 21, where said transparent pen-enabled window comprises a transparent control.

23. The apparatus of claim 21, where said non-pen enabled window comprises a control.

24. The apparatus of claim 21, wherein said moving means includes at least one of means for placing said transparent pen-enabled window in a lower Z-order than said visible non-pen-enabled window and means for removing said transparent pen-enabled window from a visible desktop.

* * * * *

UNITED STATES PATENT AND TRADEMARK OFFICE
CERTIFICATE OF CORRECTION

| | | |
|---|---|---|
| PATENT NO. | : 7,904,823 B2 | Page 1 of 1 |
| APPLICATION NO. | : 10/391073 | |
| DATED | : March 8, 2011 | |
| INVENTOR(S) | : Beauchamp et al. | |

It is certified that error appears in the above-identified patent and that said Letters Patent is hereby corrected as shown below:

Title Page

On page 3, in column 2, under "Other Publications", line 5, delete "Deliverying" to insert -- Delivering --, therefor.

On page 3, in column 2, under "Other Publications", line 52, delete "Expets" and insert -- Experts --, therefor.

On page 3, in column 2, under "Other Publications", line 59, delete "Broswer" and insert -- Browser --, therefor.

On page 4, in column 1, under "Other Publications", line 1, delete "Amo" and insert -- Arno --, therefor.

On page 4, in column 1, under "Other Publications", line 20, delete "Nerwork" and insert -- Network --, therefor.

On page 4, in column 2, under "Other Publications", line 33, delete "Ofice" and insert -- Office --, therefor.

In column 1, line 62, delete "application," and insert -- application. --, therefor.

Signed and Sealed this
Fourth Day of October, 2011

David J. Kappos
*Director of the United States Patent and Trademark Office*